Feb. 26, 1957 P. G. PALMGREN ET AL 2,783,102
RAILROAD AXLE JOURNAL BEARING CONSTRUCTION
Filed April 2, 1951 3 Sheets-Sheet 1

Inventors:
Per Gunnar Palmgren
Frederick S. Ball
Carl Eric Göte Johansson
Basil L. Haley
by their Attorneys
Howson & Howson Feb. 26, 1957   P. G. PALMGREN ET AL   2,783,102
RAILROAD AXLE JOURNAL BEARING CONSTRUCTION
Filed April 2, 1951   3 Sheets-Sheet 2
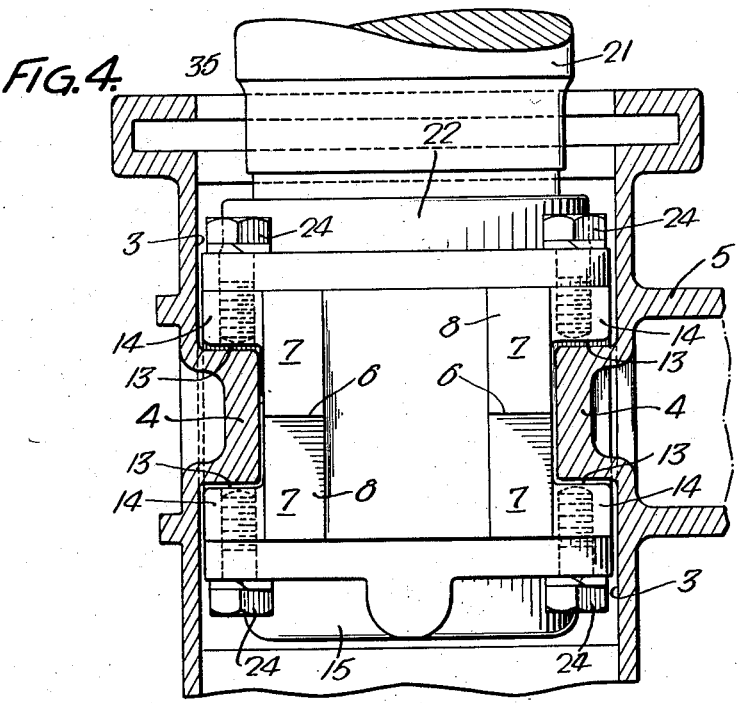
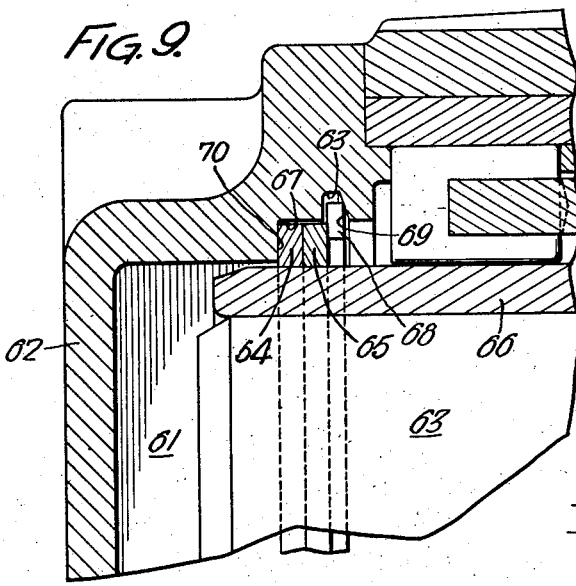
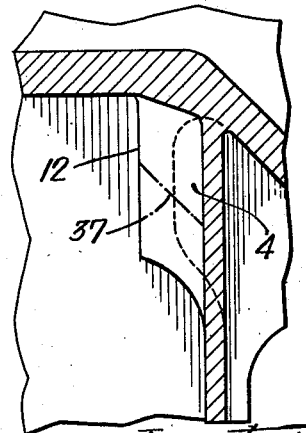
Inventors:
Per Gunnar Palmgren
Frederick S. Ball
Carl Eric Göte Johansson
Basil I. Haley
by their Attorneys
Howson & Howson Feb. 26, 1957 P. G. PALMGREN ET AL 2,783,102
RAILROAD AXLE JOURNAL BEARING CONSTRUCTION
Filed April 2, 1951 3 Sheets-Sheet 3
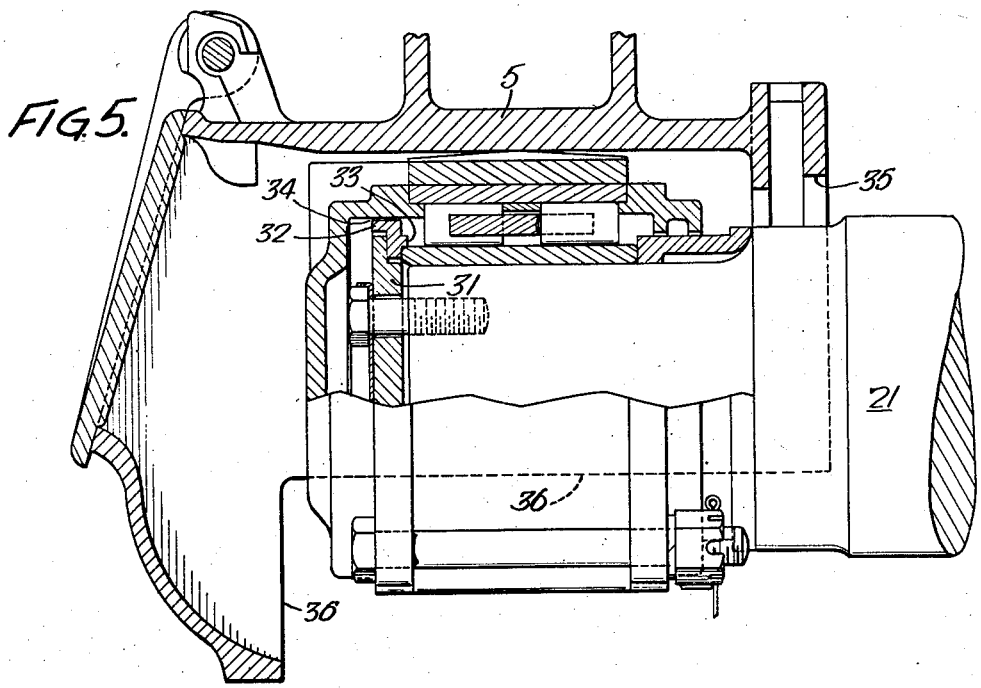
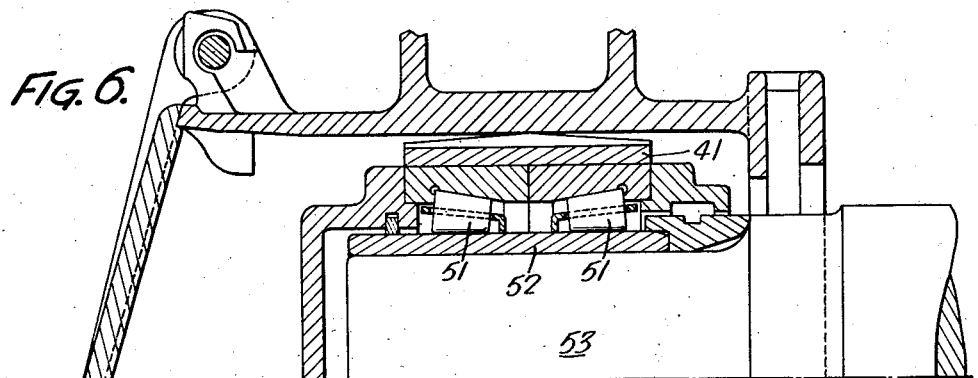
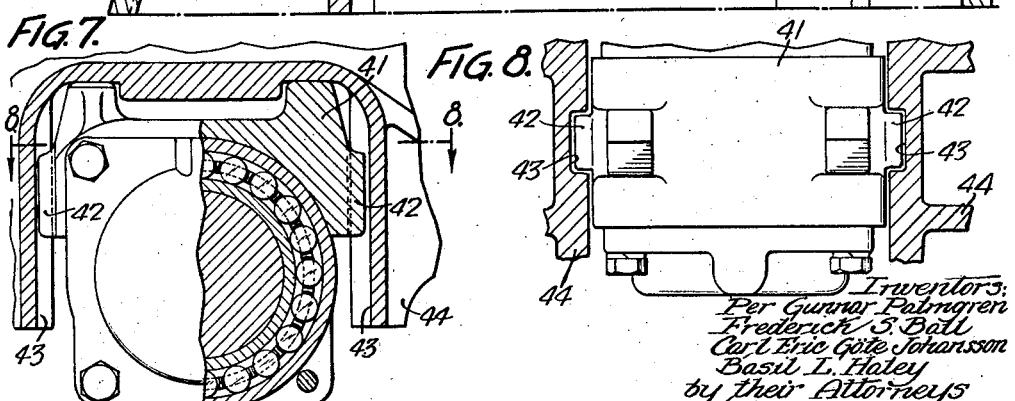

United States Patent Office 2,783,102
Patented Feb. 26, 1957

2,783,102

RAILROAD AXLE JOURNAL BEARING CONSTRUCTION

Per Gunnar Palmgren and Frederick S. Ball, Philadelphia, Pa., Carl Eric Gote Johansson, Rio de Janeiro, Brazil, and Basil L. Haley, Toronto, Ontario, Canada, assignors to SKF Industries, Inc., Philadelphia, Pa., a corporation of Delaware Application April 2, 1951, Serial No. 218,714

4 Claims. (Cl. 308—180)

This invention relates to improvements in railroad journal structures and embraces a bearing cartridge of novel form which, while having an application of particular importance to railroad journals, possesses valuable characteristics of advantage in other fields of use.

The invention has for its primary objects:

(1) To provide a practical and economical method of applying antifriction bearings to journal boxes of the type wherein the box constitutes an integral part of the side frame;

(2) To make possible installation of the more useful forms of bearing in existing boxes of the stated type;

(3) To provide for installation in boxes of the stated type of roller bearings having the highest possible capacities;

(4) To reduce cost of future side frames, journal boxes, and bearings;

(5) To avoid disturbance to truck parts when attaching axle antifriction bearing assembly to trucks, or detaching them therefrom;

(6) To make possible adaptation of standardized units of antifriction bearing-axle assembly to various and differing trucks by providing for use of interchangeable loading blocks;

(7) To provide a novel form of antifriction bearing cartridge wherein the outer race ring of the bearing constitutes a structural element of the cartridge, said ring forming in effect the body portion of the cartridge whereby necessity for a separate housing is eliminated and the resulting saving in space between the axle journal and the frame may be used to receive bearings of highest possible capacity; and (8) To provide a bearing cartridge wherein provision is made for lateral movements of the axle relative to the cartridge and wherein, further, provision is made for control of such movements by regulated air cushion between axle and cartridge.

In the attached drawings:

Fig. 4 is a sectional view on the line 4—4, Fig. 2;

Fig. 5 is a sectional elevational view similar to Fig. 1 showing a modification within the scope of the invention;

Fig. 6 is a fragmentary sectional side elevational view illustrating a further modification;

Fig. 7 is a sectional end elevational view of a journal box installation, including a bearing and axle assembly according to the invention, and illustrates a still further modification within the scope of the invention;

Fig. 8 is a sectional view on the line 8—8, Fig. 7;

Fig. 9 is a fragmentary sectional elevational view illustrating a further modification within the scope of the invention, and Fig. 10 is a fragmentary sectional view showing a detail of a conventional journal box before modification in accordance with the invention.

American railroads conventionally use plain bearings in freight cars, said bearings taking the form of circular sectors of brass laid over the ends of axles turned down to leave inner and outer shoulders for retaining the brass. A wedge between the brass and the internal top of the journal box has notches cut on both sides to receive axial load from lugs such as indicated at 4 in Fig. 10, centrally located within the box. The wedge passes this axial load to the axle by means of lugs on its underside fitting into depressions in the brass, either end of which may bear against a shoulder of the axle. The journal box, cast integrally with the side frame of the truck, transmits radial and axial loads to the wedge and also encloses the bearing for protection. This type of combined box and frame, made in several sizes and modifications, provided minimum cost bearing equipment for freight cars and gave satisfactory service until recent increases in train speeds brought about greater roughness in riding qualities of the cars and instances of greater damage to lading. Railroads then sought to apply antifriction bearings, in order to take advantage of their reliable, low friction, uniform, low maintenance, long life operation, but found first cost far out of proportion with other units of the car structure. Antifriction bearings, having much greater first cost, heretofore required more accessory parts for mounting and for complete protection, and did not go well into space designed for plain bearings, because long slim rollers which would fit between raceways occupying the space now allowed to wedge and brass, would not have nearly so much capacity as larger rollers of shorter length. Antifriction bearings of greatest capacity have high narrow cross sections, whereas plain bearings have long low cross sections. These opposing characteristics have balked antifriction engineers for many years in applying their bearings to railroad cars, especially to freight cars. Some have designed boxes and/or frames to suit their own particular bearings, but these have proven unattractive for general adoption. Railroads prefer standardization and especially desire to apply antifriction bearings to existing side frames. The present invention provides novel devices to this end which have attained ready acceptance by railroad engineers.

Figure 1:
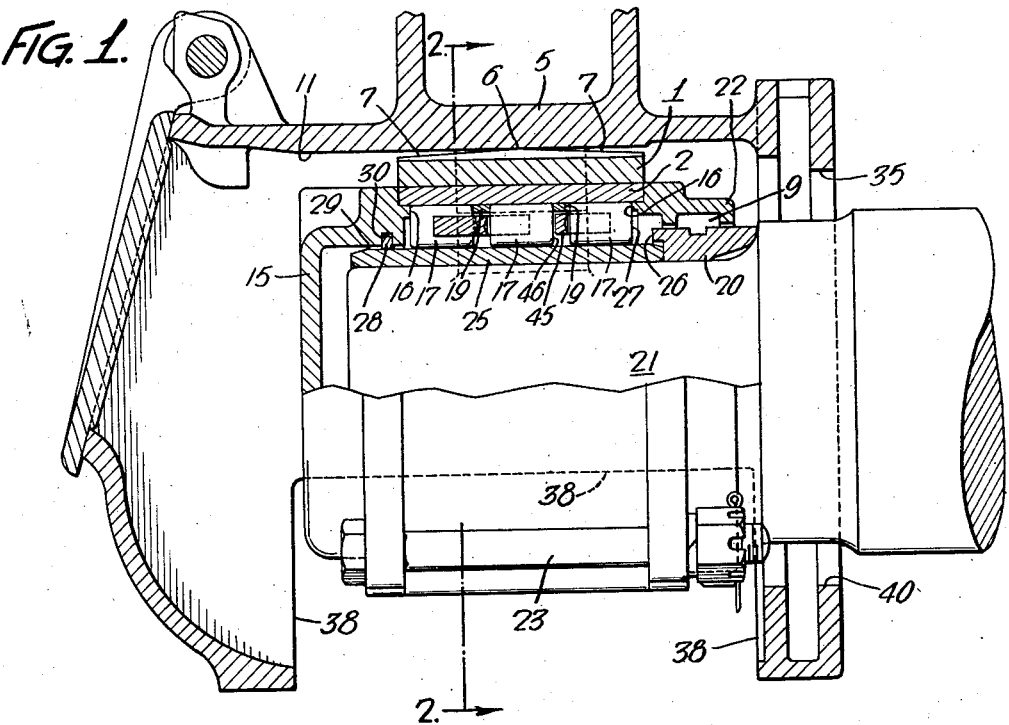
Fig. 1 is a sectional side elevational view of a bearing and axle assembly according to the invention installed in a railway journal box cast integrally with the side frame of a truck.
Figure 2:
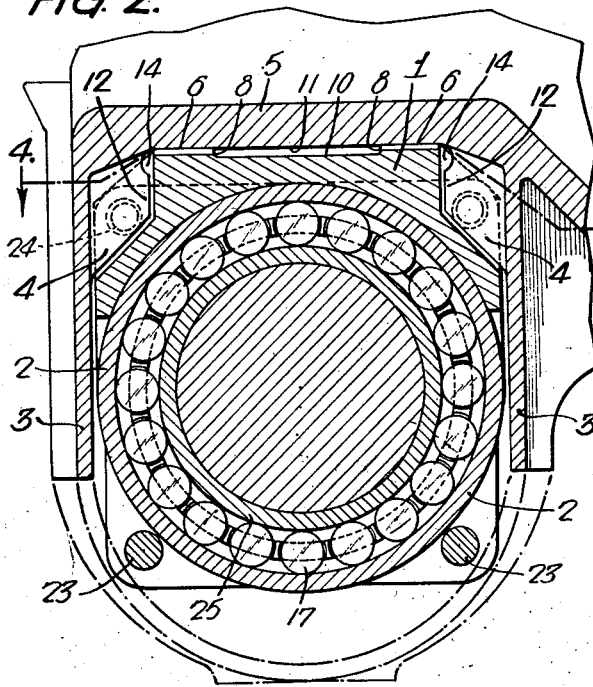
Fig. 2 is a sectional view on the line 2—2, Fig. 1.
Figure 3:
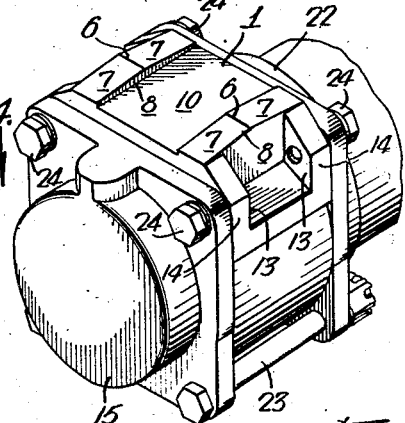
Fig. 3 is a view in perspective of the bearing and axle assembly showing the loading block mounted on the outer race of the bearing between end covers.

In order to provide a cylindrical roller bearing possessing capacity higher than the antifriction bearings previously applied to freight car journal boxes, this invention contemplates cutting the axle to the minimum permissible diameter to which it may be worn down by a plain bearing, and also the mounting of the loading block 1, see Figs. 1, 2, and 3, directly on the outer race ring 2 of the roller bearing. This arrangement makes available to the bearing, space formerly occupied by the housing, and provides for a bearing whose outside diameter nearly equals the internal width of the integral box 3, as shown in Fig. 2. This bearing can have the largest diameter roller that could be accommodated within these standard boxes and will therefore possess highest endurance capacity. Since increase in diameter of roller permits corresponding decrease in length for the same capacity, the bearing may have narrowest possible width.

Previous antifriction bearing applications in journal boxes of this type, in order to secure high capacity, have placed one row of rollers at each end of an outer race ring shaped like a dumbbell with small diameter midsection to avoid the lugs 4. The available space between the two rows of rollers was too restricted for rollers of any suitable size. By cutting away a portion of the lugs 4, i. e. the lower portions below the broken line 37 in Fig. 10, in accordance with the present invention, space is afforded, see Fig. 2, for rollers of maximum size over the whole length of the bearing, which makes possible the provision of a much shorter roller bearing of highest capacity for the diametral space available. The bearing of this invention not only costs materially less itself, but also, due to shortened length, saves cost of future boxes for use with antifriction bearings.

As distinguished from the prior method of central support of car load, loading block 1 of this invention, receives load from the side frame 5 on rounded ridges 6 at the apices of inclined flat surfaces 7, 7 of two ribs 8 located at each edge of the block. Since the block occupies nearly the whole width of the box 3, as shown in Fig. 2, the two halves of the load falling on the ribs will have the widest possible spacing. This affords the greatest possible leverage for friction at the load points to oppose relative angular movement of the frame and axle about the vertical axis through the center of the block. This friction movement offers very substantial resistance of the order of 25,000 to 50,000 pounds inches, depending upon car size and its loading, against rotation of the truck frame with respect to the axle. Thus this device permits variation of angle between axle and side frame, but retards this motion and thus steadies the operation of the truck without unduly binding the bearing. Wear takes place about equally on both ridges, and since the frame can never contact the cut-out center 10 of the block, no deterioration will occur in these conditions throughout the life of the parts. Present day construction provides for resting the flat under surface 11 of the frame on a convex surface of the box (and/or wedge). The slight but continuous rotational sliding soon wears the convex surface to a cone, which provides a very much shorter and lessening leverage against rotation about the axis through the center of the box. Lateral loads pass from the upper part 12 of lugs 4 to faces 13 of flanges 14 of loading block 1, and thence through an outer cover 15 by means of abutment 16 to the rollers 17 and spacers 19 and through collar 20 to axle 21, see Figs. 1, 2 and 3.

Such a loading block also serves to adapt the cartridge to various existing types of truck frame by merely changing dimensions of the block. This reduces inventory requirements and expands the useful field of application of the invention.

The bearing of this invention eliminates the large and expensive housing heretofore employed to protect the bearing and to provide a reservoir of lubricant, by bolting an outer cover 15 and an inner cover 22 against the outer and inner ends, respectively, of the outer race ring 2 of the bearing. These covers seal the interior of the bearing and completely protect all rolling surfaces, it being noted that a chamber 9 is formed between the cover 22 and collar 20 for reception of a suitable sealing medium such for example as a heavy grease. Lower bolts 23, 23 extend from cover to cover while upper bolts 24 screw into flanges 14 of the block 1. All of these lugs lie outside of the bearing so that they avoid any necessity for tapped holes in the race ring which would tend to reduce its solidity.

The drawings illustrate a cylindrical roller bearing in which rollers 17 roll between outer race ring 2 and inner race ring 25. The bearing in Fig. 1 has three rows of rollers guided continuously by the outer and inner end covers 15 and 22, respectively, and spacer rings 19 inside the outer race ring 2, and guided intermittently at the ends by face 26 of the collar 20. The inner ring extends beyond the outer ring a considerable distance so that it may move axially with respect to the rollers. The rollers offer to the axle's lateral motion only the very low resistance to sliding, termed "apparent sliding" as explained in U. S. Patent No. 2,751,266 of June 19, 1956. When the truck frame 5 moves to the right as viewed in Fig. 1, the lugs 4 will carry loading block, box, outer race-cover-roller assembly to the right until the inner ends 27 of the inboard row of rollers, strike face 26 of collar 20. Thereafter lateral loads from the car body, will pass through the bearing and axle to receive support from the wheel flanges. This invention therefore permits limited lateral motion of the axle which railroad engineers have found to cut down factors of damage to lading.

The aforesaid U. S. Patent No. 2,751,266 also discloses a means for damping lateral oscillation of the axle by providing a closed chamber at each end of the axle, in which its movement compresses or evacuates air, subject to regulation by a piston ring, restricted escape passage, or other choking device. This invention uses the axle, surrounded by an extension of the bearing inner ring, as a piston and the inside of the cover as a cylinder. The piston acts by increasing or decreasing air pressure in the end of the cylinder, as controlled by piston ring 28 wrapping with suitable pressure around smoothly ground inner raceway 29 on which it slides laterally. The piston ring rests loosely in slot 30 in cover 15. Thus, by installation of the piston ring as the single accessory part, this invention achieves the damping effect found by test to cut factors of damage to lading by 75% or more below those shown by plain bearings.

Fig. 5 discloses plate 31 and ring 32 attached to the end of the axle, which provides an outboard abutment 33, and forms a closely restricted passage 34 between cover and outside diameter of ring. Here again by adding the single accessory ring 32, this invention achieves damping effects of high efficiency. This arrangement has no sliding friction to cause wear, and therefore will operate indefinitely without deterioration.

The standard freight car boxes have a dustguard opening 35 in the inboard wall, through which the axle passes for assembly with the plain bearing, wedge and box. Antifriction bearings of the short-roller high-capacity type will not pass through this opening. This invention provides in novel manner for installation of this high capacity bearing, by cutting away a portion of the lower region of the box 3 as indicated in Fig. 5 by the lines 36, so that the box will drop over the axle equipped with the bearing cartridge; and also by cutting away the lower portions of the lugs 4 as previously described, to make room for the necessarily larger diameter of its outer ring. Such removal of metal, leaves openings in the walls of the box, which completely destroy its protective qualities, but which affect its strength very slightly or not at all. This invention then encloses the working elements of the bearing, by bolting the two cover plates 15 and 22, to the two ends of the outer ring, forming in effect a cartridge within which all rolling surfaces are completely protected, and which provides for maintenance of a reservoir of lubricant. Such enclosure constitutes novel construction, eliminates a housing, and saves costs.

When inspection of bearings becomes desirable, removal of axles from trucks for that purpose in the present conventional journals often requires prior removal of springs and/or other parts. The aforedescribed embodiment of this invention eliminates these time-consuming difficulties because when the box is cut along line 36 as described, lifting of the truck will leave all axles with their bearing and block assemblies on the track.

When the cut-out portion of the box terminates short of the inner side of the box, as indicated by the lines 38 in Fig. 1, lifting of the truck will cause the axles to rest on the top of the bottom wall 40 of the dustguard hole 35, so that they will remain with the truck for transportation to any desired location. Either type of cut-out may be provided as may be found expedient.

Since the complete assembly of bearing and block will not pass through the dustguard opening, use of the second type of cut-out requires: first, lifting an assembled unit, comprising block 1, outer ring 2, end covers 15 and 22 and the rollers, up into place through the bottom opening; and second, inserting the axle, carrying collar 20 and press-fitted inner ring 25 within the rollers. This process takes time and care in contrast with the simpler one of lowering the truck over the block and bearing completely assembled on the axle, as permitted by the first type of cut-out.

Figs. 7 and 8 illustrate a loading block 41 differing from that previously described by provision of a central lug 42 at each side adapted to fit into a notch 43 in side frame 44. In this case the frame does not include the box cast integrally, but will accept a separate plain bearing box having a notch which straddles the entire frame. The possibility of adapting anti-friction bearings to a frame also taking standard plain-bearing boxes, permits any railroad to make emergency replacements, because the railroads have standard plain-bearing boxes always in stock. The invention therefore opens a wide field of application to antifriction bearings and opens to all railroads the benefits of their use. Heretofore, many railroads have hesitated to adopt antifriction bearings because of the inability of railroad shops to make replacements except at prohibitive costs, and after waiting long periods of time for new antifriction bearings from the car owners.

The cross-sectional view of Fig. 1, shows a cylindrical roller bearing having three rows of rollers. A conventional form of cast cage having drilled pockets in staggered arrangement on the opposite sides of a central ring, spaces the rollers of the two left rows. A separate cage 45 is used for the third or innermost row of rollers, said cage having drilled pockets on one side only, and using the ends 46 of the proximate rollers to keep it in place in the axial direction. A cage spanning three rows of rollers would necessarily contain a broached pocket for the central row as distinguished from axially drilled pockets for the two outermost rows. Such a cage complicates bearing assembly by requiring radial insertion of the central rollers and axial insertion of the end rollers. Also, central rectangular pockets will not locate the rollers for easy assembly into the race rings. Rollers will stay within axially drilled pockets of both the double and single row cages of the bearing illustrated in the drawings when held with their axes in a vertical position. Inner and outer race rings will readily go inside or outside, respectively, of the nested rollers. The novel single row cage of this invention, having pockets on one side only, thus saves cost of material and assembly time.

The embodiment of the invention illustrated in Fig. 6 corresponds structurally to those described above with the exception that the roller bearing is of tapered roller type. The rollers 51 are arranged so that their contact lines with the inner race ring 52 are parallel to the axis of the axle 53, the said inner ring being of the same cylindrical form as those of the said other embodiments. This affords the same freedom for the lateral axle movements described above, but with a degree of true sliding motion between the rollers and the inner ring.

There may be numerous changes in detail without departure from the invention, and in Fig. 9 I have illustrated a desirable device for choking the flow of air into and out of the cylinder 61 in the end cover 62 of the bearing cartridge for control of the relative axial movements of the axle 63. In this case a pair of solid rings 64, 65, closely embracing the inner race 66, are confined under pressure between the inner wall 70 of a recess 67 in the cover 62 and a snap ring 68 which occupies a slot 63 adjoining the outer end of the said recess. The wall 69 of the slot is inclined outwardly toward the recess 67 so that expansion of the snap ring in the slot in contact with the inclined wall 69 develops an axial component of force which forces the snap ring axially against the ring 65 and forces the rings 64 and 65 against the said inner wall 70 of the recess.

The solid rings fit closely around the inner race. They will spring outwardly at points where out-of-roundness may cause them to pinch the inner race, and wear in the region of such points, until the interfering metal has disappeared; pressure upon the inner race has stopped, and close sealing fits become established. Because of the small angle between the face of the snap ring and the inner wall of the slot, the sealing contact between the solid rings and recess wall, will remain tight under any combination of air pressure and frictional drag that can occur. Due to the out-of-roundness, slight clearances may exist between the inner raceway and the bores of the sealing rings. Since only a very few of these will exist in either ring and since the sealing locations of one ring will overlap the clearance regions of the other in most cases, very little leakage will occur. This device will provide more effective sealing than the standard type of split piston ring, and would produce less wear because the solid rings will not press against the inner raceway after wearing to a fit. Split piston rings will continue to wear because they wrap around the inner bearing ring.

We claim:

1. In a railroad axle journal, inner and outer radially spaced race rings, rollers confined between said rings, said inner race ring being secured to the said journal, a cover member secured against an end of the outer ring and having a cylindrical recess receiving the end of the axle journal and the proximate end of the inner ring, said journal and inner ring forming a piston movable axially in the cover recess as a cylinder, and means for retarding the movement of air to and from the cylinder.

2. A journal according to claim 1 wherein said retarding means comprises a piston ring confined in a groove in one of the confronting cylindrical surfaces of said piston and recess and engaging the other of said cylindrical surfaces.

3. In a railroad axle journal as defined in claim 1 including means for confining said rollers against axial displacement with respect to said outer race ring and cover, said inner race ring being cylindrical in form and affording freedom for limited axial movements of the journal in and with respect to said rollers, outer race ring and cover, and a thrust surface fixed on said journal engageable by said rollers to limit axial movement of said rollers, outer race ring and cover with respect to said inner race ring and journal.

4. In an antifriction bearing structure for railway axle journals, a journal, an inner race ring secured to the said journal, an outer race ring, rollers confined between said rings, and an end cover member secured against one end of the outer ring, said member having an inner cylindrical chamber receiving the end of the journal and forming with the journal a dash pot for controlling relative axial movements of the bearing and the journal, said chamber terminating at its open end in a cylindrical counterbore of increased diameter having a circumferential slot intermediate the ends thereof, the side wall of the slot toward the said open end of the chamber being inclined outwardly and away from the opposite wall, ring means mounted in the said section of increased diameter and closely embracing the journal, the effective depth of said counterbore being less than the corresponding dimension of the ring means so that the latter when fully seated in the inner end of the counterbore overlaps the near side of the slot, and a snap ring in said slot confined under compression between the end of the ring means and the said inclined wall of the slot and exerting a component of force tending to hold the ring means to its seat in the inner end of said counterbore.

References Cited in the file of this patent

UNITED STATES PATENTS

| | | |
|---|---|---|
| 1,071,989 | Dehu | Sept. 2, 1913 |
| 1,701,010 | Nystrom | Feb. 5, 1929 |

(Other references on following page)

UNITED STATES PATENTS

| | | | |
|---|---|---|---|
| 1,875,770 | Stertzbach | Sept. 6, | 1932 |
| 1,921,882 | Horger | Aug. 8, | 1933 |
| 1,921,883 | Horger | Aug. 8, | 1933 |
| 1,924,270 | Buckius | Aug. 20, | 1933 |
| 1,952,710 | Horger | Mar. 27, | 1934 |
| 1,978,707 | Gibbons | Oct. 30, | 1934 |
| 2,074,202 | Benedek | Mar. 16, | 1937 |
| 2,273,510 | Brauer | Feb. 17, | 1942 |
| 2,433,022 | Brittain | Dec. 23, | 1947 |
| 2,438,214 | Horger | Mar. 23, | 1948 |
| 2,528,394 | Shaffer | Oct. 31, | 1950 |
| 2,560,183 | Noe | July 10, | 1951 |
| 2,565,284 | Trbojuvich | Aug. 21, | 1951 |
| 2,597,516 | Noe | May 20, | 1952 |

FOREIGN PATENTS

| | | | |
|---|---|---|---|
| 448,395 | France | Jan. 29, | 1913 |
| 648,250 | Germany | July 26, | 1937 |